US 7,826,927 B2

(12) United States Patent
Kawaguchi et al.

(10) Patent No.: US 7,826,927 B2
(45) Date of Patent: Nov. 2, 2010

(54) LEGGED MOBILE ROBOT

(75) Inventors: Yuichiro Kawaguchi, Wako (JP); Taro Yokoyama, Wako (JP); Tomoki Watabe, Wako (JP); Minami Asatani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 643 days.

(21) Appl. No.: 11/608,021

(22) Filed: Dec. 7, 2006

(65) Prior Publication Data

US 2007/0135966 A1 Jun. 14, 2007

(30) Foreign Application Priority Data

Dec. 12, 2005 (JP) ............................. 2005-358166

(51) Int. Cl.
*G05B 19/048* (2006.01)
(52) U.S. Cl. ...................... 700/253; 700/245; 700/250; 901/1; 701/301
(58) Field of Classification Search ................. 700/245, 700/250, 253, 255; 318/568.12; 901/1; 180/7.1, 180/8.1–8.6; 701/300–302
See application file for complete search history.

(56) References Cited

U.S. PATENT DOCUMENTS 4,644,237 A * 2/1987 Frushour et al. ............ 318/640

| | | | | |
|---|---|---|---|---|
| 5,805,103 A * | 9/1998 | Doi et al. | ...................... | 342/70 |
| 6,169,478 B1 * | 1/2001 | Hada et al. | .................. | 340/435 |
| 6,173,215 B1 * | 1/2001 | Sarangapani | ................ | 700/255 |
| 6,515,614 B2 | 2/2003 | Sakai et al. | | |
| 2004/0193323 A1 * | 9/2004 | Higaki et al. | ............... | 700/259 |
| 2005/0113973 A1 * | 5/2005 | Endo et al. | .................. | 700/245 |
| 2006/0009879 A1 * | 1/2006 | Lynch et al. | ................ | 700/245 |

FOREIGN PATENT DOCUMENTS

JP 2002-202815 7/2002

OTHER PUBLICATIONS

Y. Zhang, Q. Wang, W. Qiang and P. Fu, "A New Method of Desired Gait Synthesis in Biped Robot," in Proc. 3rd World Congress on Intelligent Control and Automation, 2000, pp. 1300-1304.*

* cited by examiner

*Primary Examiner*—Thomas G Black
*Assistant Examiner*—Peter D Nolan
(74) *Attorney, Agent, or Firm*—Rankin, Hill & Clark LLP

(57) ABSTRACT

When there is an object that has a possibility to come into contact with a robot 1 in a desired path, the robot 1 is decelerated stepwise according to the distance L from the robot 1 to a predicted contact position along the desired path. For example, legs 13 and the like of the robot 1 are so controlled that when the distance L is less than a first threshold $L_1$, the moving speed is reduced to a first speed $V_1$, and when the distance L is less than a second threshold lower than the first threshold, the moving speed is reduced from the first speed to a second speed.

9 Claims, 8 Drawing Sheets

LEGGED MOBILE ROBOT

BACKGROUND OF THE INVENTION

1. Field of the Invention

The present invention relates to a legged mobile robot.

2. Description of the Related Art

Conventionally, autonomous moving devices have been proposed (for example, see Japanese Patent Laid-Open No. 2002-202815 and U.S. Pat. No. 6,515,614), which detect obstacles using ultrasonic sensors, infrared sensors, or the like so that the moving speed or the like will be reduced to control the movement of the devices in order to avoid contact with the obstacles.

However, since a legged mobile robot moves while repeating lifting off and landing on a floor of each foot, it has such a unique moving pattern that the landing positions of each foot are not continuous but are discrete. Therefore, merely decelerating the speed of the robot or making the robot stop to avoid contact with the obstacles could make the behavior of the robot unstable. For example, when the leg of the robot is about to land on a floor, if the landing position (or the length of stride of the robot) or the landing timing is changed, the behavior of the robot could become unstable because of the need to keep its balance by its body or the like.

Therefore, it is an object of the present invention to provide a legged mobile robot capable of avoiding contact with objects while keeping the behavior of the robot stable in view of the unique moving pattern of the legged mobile robot.

SUMMARY OF THE INVENTION

A first invention for solving the aforementioned problem provides a legged mobile robot, which moves with repeated lifting off and landing on a floor of each of a plurality of legs extending from a body, the legged mobile robot comprising: a detection processor for detecting the position or location of each of objects around the robot; a contact determination processor for determining the presence or absence of a predicted contact position, at which the robot has a possibility to come into contact with an object in its desired path, based on the position or location of the object measured by the detection processor; a distance calculation processor for calculating the distance from the robot to the predicted contact position when the contact determination processor determines the presence of the predicted contact position between the robot and an object; and an operation control processor for controlling the operation of the robot in such a manner that when the distance calculated by the distance calculation processor is less than a first threshold, the moving speed is reduced to a first speed, and when the calculated distance is less than an (i+1)-th threshold lower than an i-th threshold (where i=1, 2, ...), the moving speed is reduced from an i-th speed to an (i+1)-th speed.

According to the legged mobile robot of the first invention, the operation of the robot is controlled according to the distance from the robot to the predicted contact position in its desired path (where the predicted contact position means the position at which the robot has the possibility to come into contact with an object). In other words, if the distance is less than the "first threshold," the operation of the robot is controlled to reduce the moving speed to the "first speed." Further, if the distance is less than the "(i+1)-th threshold" lower than the i-th threshold (where i=1, 2, ...), the operation of the robot is controlled to reduce the moving speed from the i-th speed to the "(i+1)-th speed." Note that the objects that has the possibility to come into contact with the robot include not only stationary objects, such as boxes on a floor, but also moving objects such as human beings or other robots.

Thus, if there is an object that has the possibility to come into contact with the robot in the desired path, the robot is decelerated stepwise as the distance to the predicted contact position with the object decreases. In other words, when the distance is equal to or more than the first threshold, the robot moves without being decelerated, but once the distance becomes less than the first threshold, the speed is reduced to the first speed. Then, when the distance becomes less than a second threshold, the speed of the robot is reduced to a second speed. After that, the moving speed of the robot is reduced stepwise as the distance decreases. Note that an n-th speed (where n=3, 4, ...) may be "0."

Thus, the moving speed of the robot can be decelerated stepwise at discrete intervals of starting deceleration from its normal speed or the like to the first speed, from first speed to the second speed, and so on. This makes it possible to decelerate the robot while keeping the behavior of the robot stable in view of such a unique moving pattern of the legged mobile robot that the landing positions of each leg are not continuous but are discrete, and hence to perform subsequent operation control smoothly, such as to stop the robot or change the path, to avoid contact with the object.

In a second invention, the legged mobile robot of the first invention is such that the operation control processor controls the landing positions of the legs at some or all of the deceleration start and end times, during which the moving speed of the robot is reduced to the i-th speed, based on the position or location of the object measured by the detection processor.

According to the legged mobile robot of the second invention, a proper landing position of each leg of the robot at the deceleration start or end time to the i-th speed can be set by making appropriate use of the unique moving pattern, in which the landing positions of each leg are not continuous but are discrete, from the standpoint of avoiding contact between the robot and the object while keeping the behavior of the robot stable. For example, if it is determined from the detected position or location of the object that the possibility of the robot coming into contact with the object can be reduced by a twisting motion of a body about a yawing axis, the landing position of each leg at the deceleration end time or the like can be so controlled that the posture of the plural legs will be made appropriate from the standpoint of avoiding unstable behavior or posture of the robot due to the twisting motion of the body.

In a third invention, the legged mobile robot of the first invention is such that the operation control processor controls the operation of the robot in such a manner that the rate of change in either or both of the length of stride or the landing cycle of the robot falls within a tolerable range.

According to the legged mobile robot of the third invention, it makes it possible to avoid the situation where the rate of change in the length of stride or the landing cycle becomes such a low level that it falls below the lower limit of the tolerable range, so that the deceleration becomes insufficient from the standpoint of avoiding contact with the object. On the other hand, it makes it possible to avoid the situation where the rate of change in the length of stride or the landing cycle becomes such a high level that it exceeds the upper limit of the tolerable range, so that the behavior of the robot becomes unstable despite deceleration is sufficient from the standpoint of avoiding contact with the object.

In a fourth invention, the legged mobile robot of the first invention is such that the operation control processor sets some or all of the i-th thresholds and the i-th speeds based on either or both of the scheduled length of stride or the scheduled landing cycle.

According to the legged mobile robot of the fourth invention, unstable behavior due to unreasonable deceleration can be avoided in view of the scheduled length of stride or landing cycle. For example, if the i-th speed is set according to the scheduled length of stride, it makes it possible to avoid the situation where there arises the need to shorten the length of stride excessively upon deceleration to the i-th speed, so that unstable behavior of the robot 1 is avoided. On the other hand, if the i-th speed is set according to the scheduled landing cycle, it makes it possible to avoid the situation where there arises the need to prolong the landing cycle excessively upon deceleration to the i-th speed, so that unstable behavior of the robot is avoided.

In a fifth invention, the legged mobile robot of the first invention further comprises plural kinds of detection processors as the detection processor, so that when the contact determination processor determines that there is a predicted contact position between the robot and the object, the operation control processor sets some or all of the i-th thresholds and the i-th speeds according to the type or the combination of types of detection processors having detected the position or location of the object, from among the plural kinds of detection processors.

According to the legged mobile robot of the fifth invention, the i-th threshold or the like is set properly in view of the detection characteristics of the plural kinds of detection processors, respectively.

In a sixth invention, the legged mobile robot of the first invention further comprises a malfunction determination processor for determining the presence or absence of a detection malfunction of any of the detection functions of the detection processors, so that when the malfunction determination processor determines that there is a detection malfunction of any of the detection functions of the detection processors, the operation control processor sets the i-th threshold larger, or the i-th speed lower, or the i-th threshold larger and the i-th speed lower, than in the case when the malfunction determination processor determines that the detection function of the corresponding detection processor is normal.

According to the legged mobile robot of the sixth invention, when a malfunction occurs in any of the detection functions of the detection processors, the i-th threshold is set larger to accelerate the start of deceleration, or the i-th speed is set lower to make the robot move more slowly, so that a sufficient distance between the robot and the object can be kept from the standpoint of avoiding contact between the two. Therefore, the robot can operate to avoid contact with the object even if the malfunction occurs and the function of detecting the position or location of the object is declined.

In a seventh invention, the legged mobile robot of the first invention is such that the operation control processor sets some or all of the i-th thresholds and the i-th speeds according to the number of objects, whose positions are detected by the detection processor, or which are determined by the contact determination processor to be located at a predicted contact position with the robot.

According to the legged mobile robot of the seventh invention, the i-th threshold or the i-th speed is set properly according to the robot environment represented as the magnitude of the number of objects located around the robot. Therefore, the robot can operate to avoid contact with the object in view of the environment.

In an eighth invention, the legged mobile robot of the first invention is such that the detection processor detects the speed of an object, and the operation control processor sets some or all of the i-th thresholds and the i-th speeds based on the detected speed of the object.

According to the legged mobile robot of the eighth invention, the i-th threshold or the i-th speed is set properly according to the object speed. Therefore, the robot can operate to avoid contact with the object in view of the object speed. For example, when the object is in motion but its motion cannot be predicted, the i-th threshold is set higher to accelerate the start of deceleration, or the i-th speed is set lower to make the robot move more slowly, so that the robot can operate to avoid contact with the object while keeping a sufficient distance from the object from the standpoint of avoiding contact with the object.

A ninth invention for solving the aforementioned problem provides a method of controlling the operation of a legged mobile robot, which moves with repeated lifting off and landing on a floor of each of a plurality of legs extending from a body, the method comprising: a detection processing step of detecting the position or location of each of objects around the robot; a contact determination processing step of determining the presence or absence of a predicted contact position, at which the robot has a possibility to come into contact with an object in its desired path, based on the position or location of the object measured in the detection processing step; a distance calculation processing step of calculating the distance from the robot to the predicted contact position when it is determined in the contact determination processing step that there is the predicted contact position between the robot and an object; and an operation control processing step of controlling the operation of the robot in such a manner that when the distance calculated in the distance calculation processing step is less than a first threshold, the moving speed is reduced to a first speed, and when the calculated distance is less than an (i+1)-th threshold lower than an i-th threshold (where i=1, 2, . . . ), the moving speed is reduced from the i-th speed to the (i+1)-th speed.

According to the method of the ninth invention, the robot can be decelerated while keeping the behavior of the robot stable in view of such a moving pattern that the landing positions of each leg are not continuous but are discrete. This makes it possible to perform subsequent operation control smoothly, such as to stop the robot or change the path, to avoid contact with the object.

A tenth invention for solving the aforementioned problem provides a program for causing a computer mounted in a legged mobile robot, which moves with repeated lifting off and landing on a floor of each of a plurality of legs extending from a body, to function as a system for controlling the robot, the system comprising: a detection processor for detecting the position or location of each of objects around the robot; a contact determination processor for determining the presence or absence of a predicted contact position, at which the robot has a possibility to come into contact with an object in its desired path, based on the position or location of the object measured by the detection processor; a distance calculation processor for calculating the distance from the robot to the predicted contact position when the contact determination processor determines the presence of the predicted contact position between the robot and an object; and an operation control processor for controlling the operation of the robot in such a manner that when the distance calculated by the distance calculation processor is less than a first threshold, the moving speed is reduced to a first speed, and when the calculated distance is less than an (i+1)-th threshold lower than an i-th threshold (where i=1, 2, . . . ), the moving speed is reduced from the i-th speed to the (i+1)-th speed.

According to the program of the tenth invention, the computer mounted in the robot can function as the system for decelerating the robot while keeping the behavior of the robot stable in view of such a unique moving pattern that the landing positions of each leg are not continuous but are discrete. This makes it possible to perform subsequent operation control smoothly, such as to stop the robot or change the path, to avoid contact with the object.

An eleventh invention for solving the aforementioned problem provides a supervising system for supervising the functions of a legged mobile robot which moves with repeated lifting off and landing on a floor of each of plural legs extending from a body, in which part or whole of the program of the tenth invention is distributed or broadcast to the computer in order to implement the operation of the robot.

According to the supervising system of the eleventh invention, the system for decelerating the robot while keeping the behavior of the robot stable in view of such a unique moving pattern that the landing positions of each leg are not continuous but are discrete can be implemented by distributing or broadcasting the program to the computer mounted in the robot at any timing. This makes it possible to perform subsequent operation control smoothly, such as to stop the robot or change the path, to avoid contact with the object.

DESCRIPTION OF THE PREFERRED EMBODIMENTS

A legged mobile robot according to a preferred embodiment of the present invention will now be described with reference to the drawings.

Referring first to FIGS. 1 through 4, the structure of a legged mobile robot (hereinafter simply called a "robot") will be described.

Figure 1:
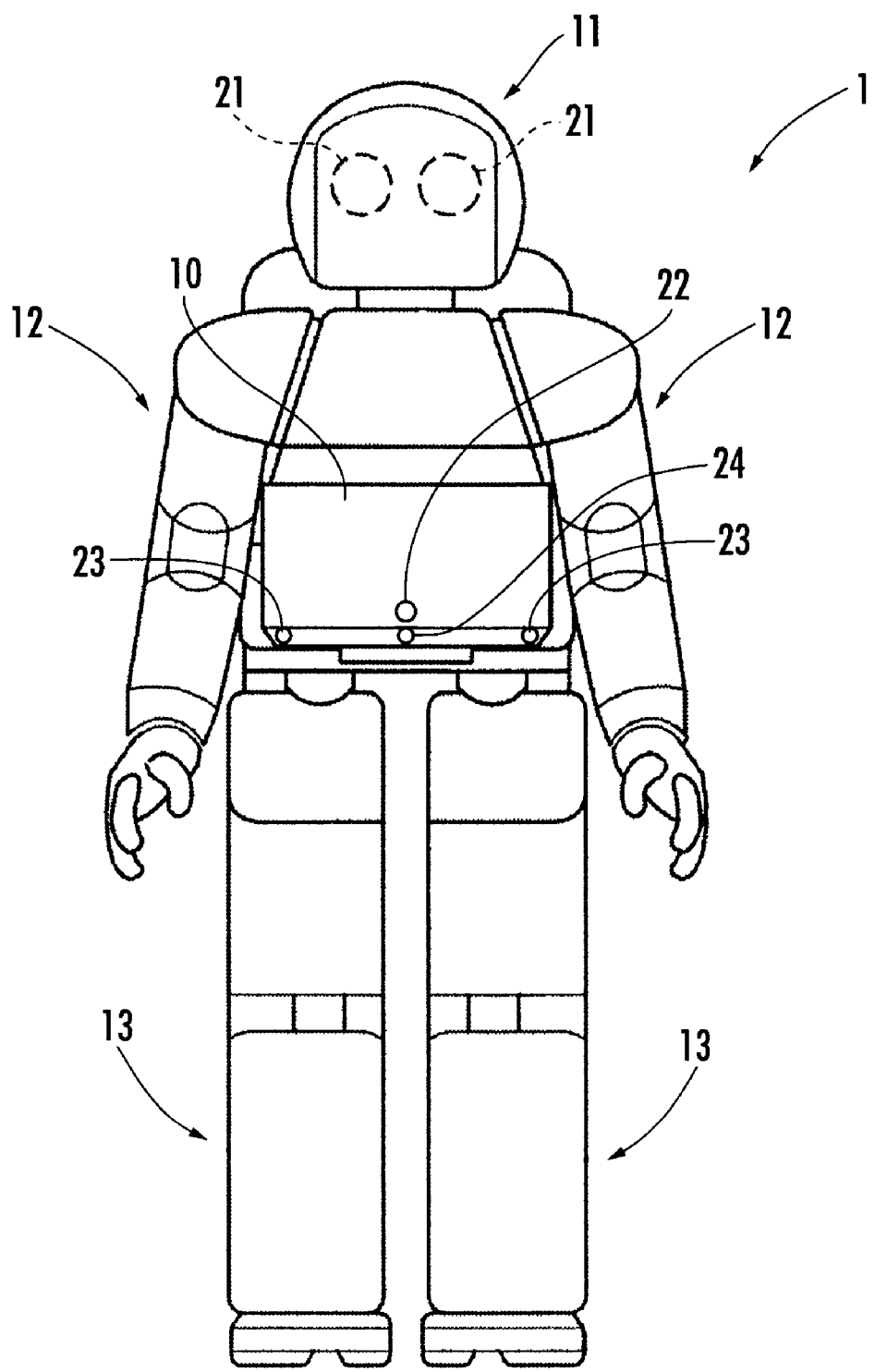
FIG. 1 is a front view explaining the structure of a robot.

A robot 1 shown in FIG. 1 has a body (base body) 10, a head 11 provided on the body 10, right and left arms 12 extending from the upper right and left side of the body 10, and right and left legs 13 extending downward from the lower end of the body 10. As disclosed in WO 03/090978 and WO 03/090979, the robot 1 operates such as to bend the arms 12 and the legs 13 by forces received from actuators (not shown) actuating plural joints corresponding to human shoulder joints, elbow joints, wrist joints, hip joints, knee joints, ankle joints, etc. The robot 1 moves with lifting off and landing on a floor of each of the right and left legs 13.

The robot 1 also includes a pair of CCD cameras 21 incorporated in the head 11 in such a manner that they are placed side by side to face forward, a plurality of ultrasonic sensors 22 provided to face outwardly in a central portion on the front side of the body 10 and in plural portions arranged horizontally on the back side of the body 10, a pair of infrared cameras 23 provided on the lower front side of the body 10 in such a manner that they are placed side by side to face downward, and an infrared irradiation device 24 provided between the pair of infrared cameras 23.

Figure 2A:
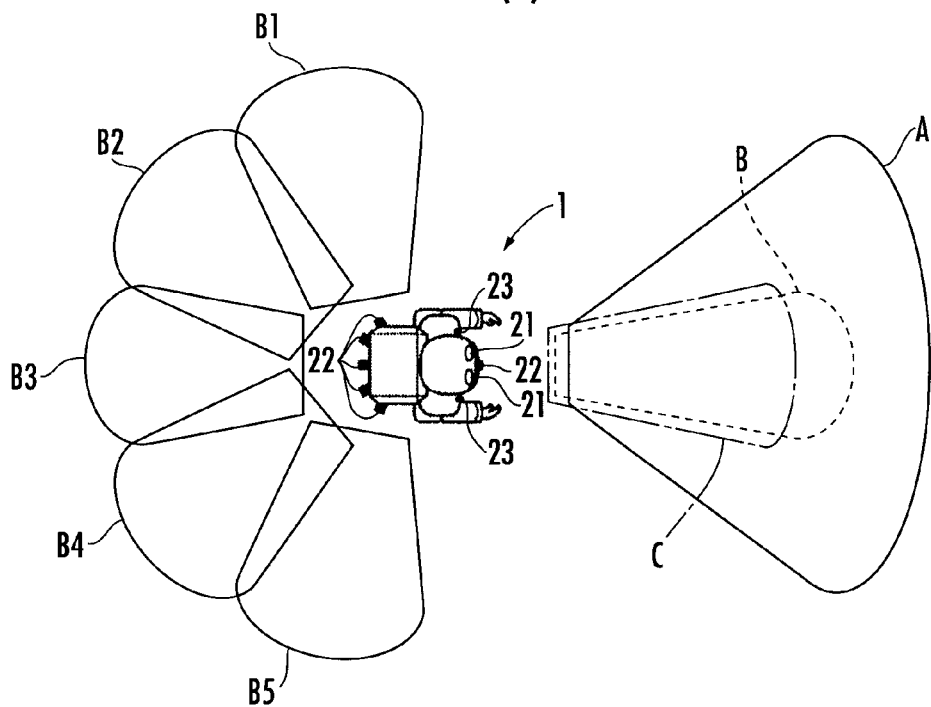
FIG. 2(a) is a top view showing object detection areas of the robot.
Figure 2B:
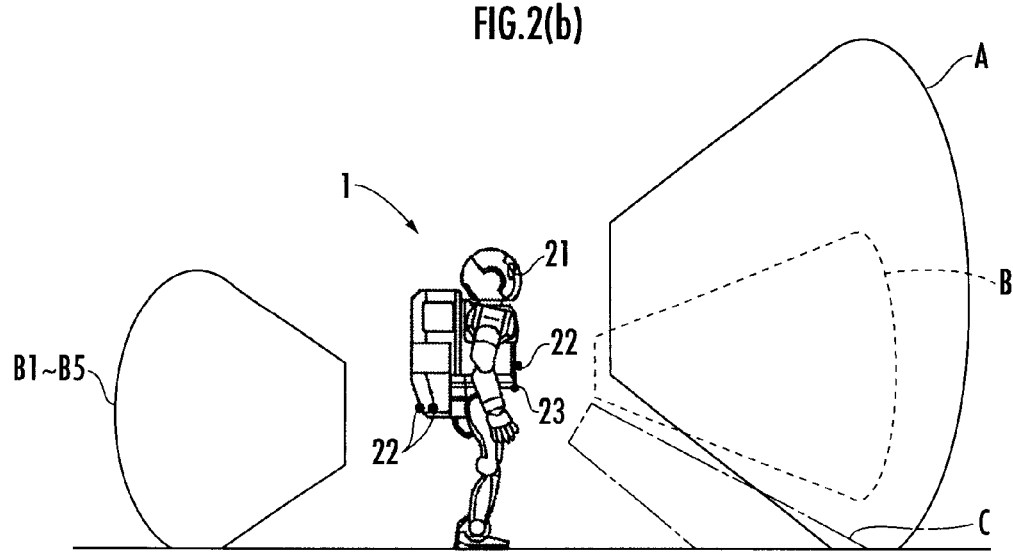
FIG. 2(b) is a side view showing object detection areas of the robot.

The pair of CCD cameras 21 are to take pictures in the forward direction of the robot 1, respectively. As shown in FIGS. 2(a) and 2(b), their shooting range A extends from slightly in front of the robot 1 to several meters away from the robot 1 at angles of 40 to 60 degrees in the horizontal and vertical directions, respectively. When the head 11 is rotated about or bent at an angle to the body 10 by the power of a corresponding actuator, the shooting range A of the CCD cameras 21 is also moved.

The ultrasonic sensors 22 detect ultrasonic waves irradiated from ultrasonic irradiation devices (not shown) outwardly from the robot 1 and reflected by objects located in ranges B and B1 to B5, shown in FIGS. 2(a) and 2(b), in which the ultrasonic waves can be transmitted. The ultrasonic detection range B of the ultrasonic sensor 22 provided on the front of the robot 1 extends forward in a range smaller than that of the range A horizontally across almost the same width as that of the robot 1 and vertically over an angle of about 30 degrees. The five ultrasonic detection ranges B1 to B5 of the five ultrasonic sensors 22 provided on the back of the robot 1 have almost the same size as the range B of the front ultrasonic sensor 22, and extend radially and outwardly from the robot 1 while partially overlapping one another.

Figure 3:
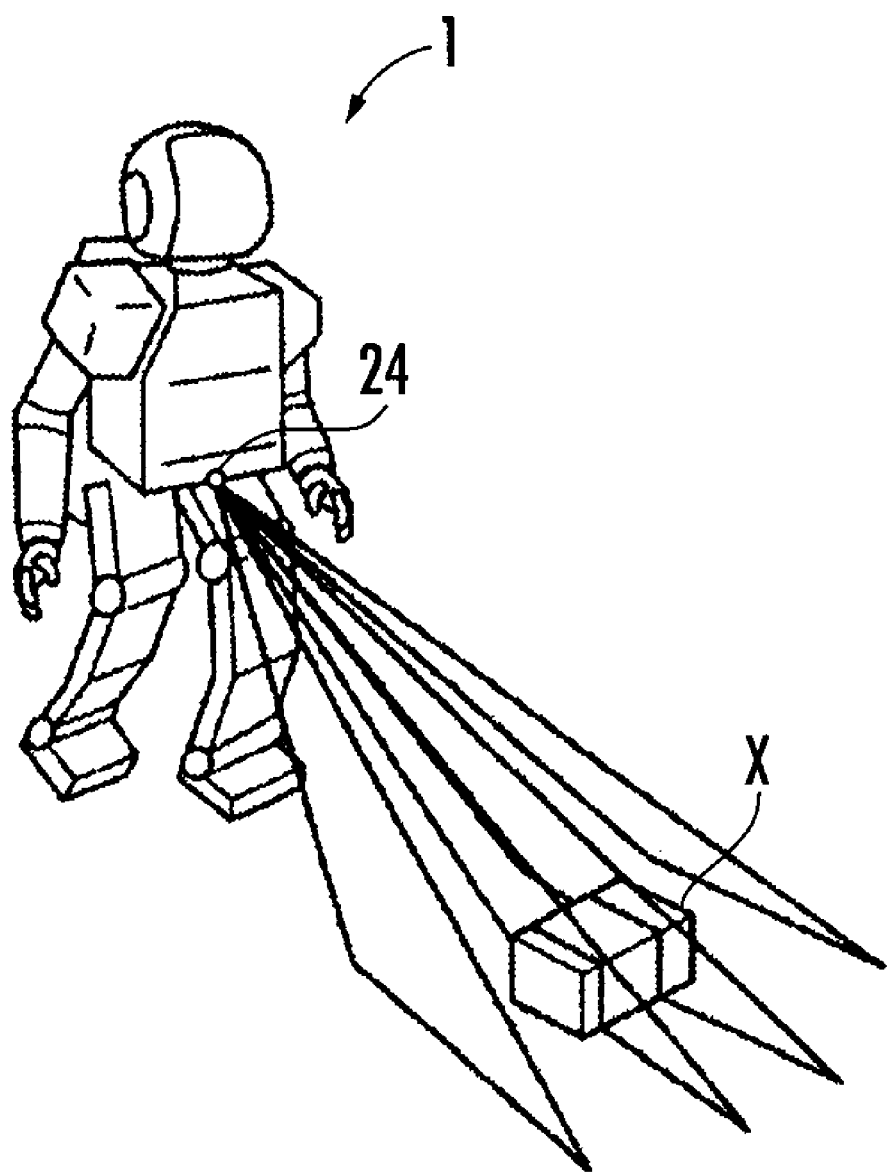
FIG. 3 is a perspective view showing states of infrared radiation from the robot.

The pair of infrared cameras 23 detect infrared rays irradiated from the infrared irradiation device 24 and reflected by objects located in a shooting range C as shown in FIGS. 2(a) and 2(b), in which the infrared rays are irradiated downwardly ahead of the robot 1. As shown in FIG. 3, the infrared irradiation device 24 irradiates slit-shaped infrared laser beams radially and downwardly ahead of the robot 1.

Figure 4:
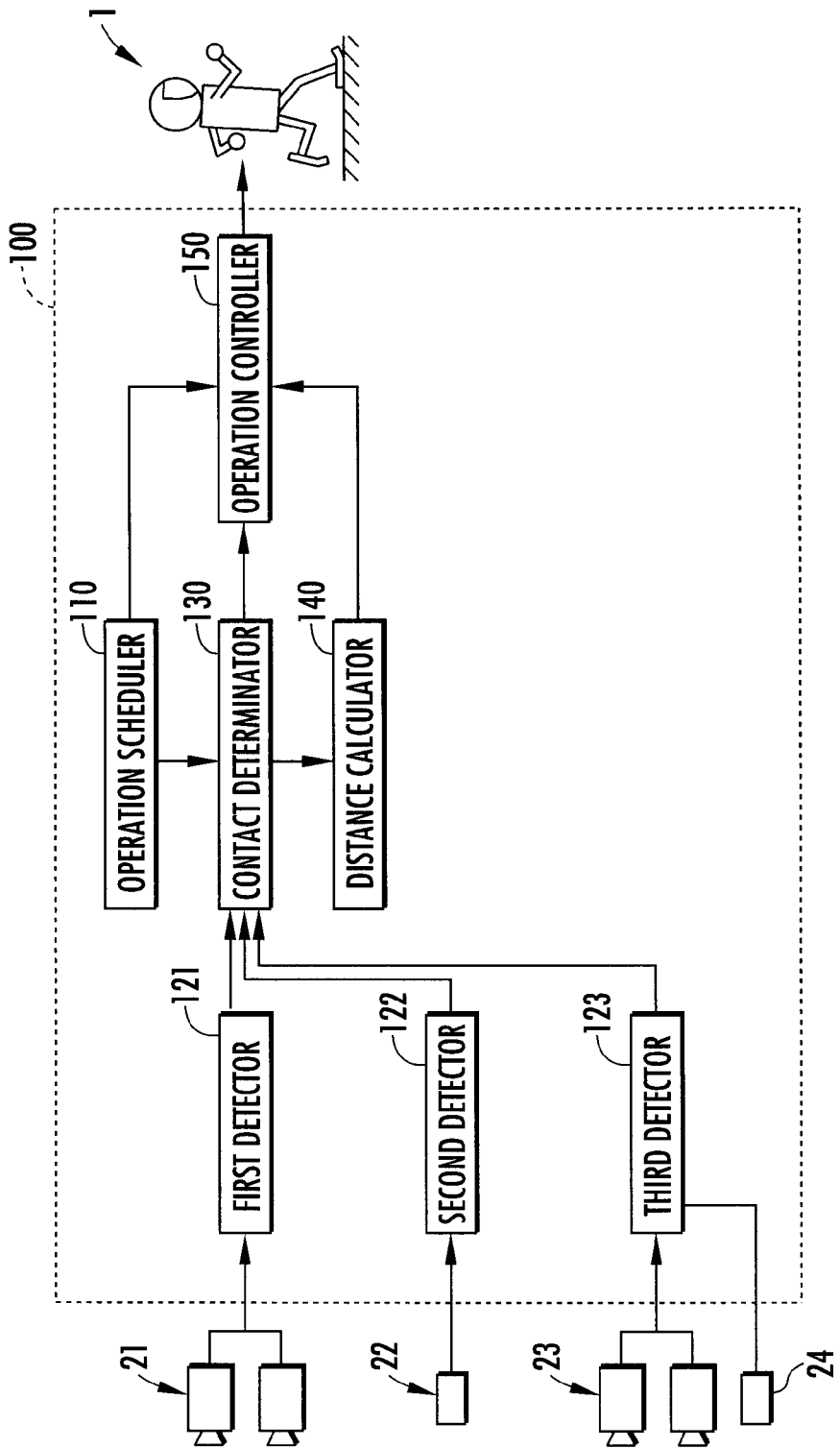
FIG. 4 is a block diagram explaining the structure of a control system of the robot.

Further, as shown in FIG. 4, the robot 1 includes a control system 100 consisting of a CPU, a ROM (such as an EEPROM), a RAM, an I/O, etc. A computer (not shown) consisting of a CPU and the like mounted in the robot 1 functions as the control system 100 according to a control program stored in a memory. The control program may be prestored in the memory, or distributed or broadcast from a server (not shown) through a network or a satellite at any time, such as when a request is sent from the robot 1 to the server so that the control program will be stored in the memory. The control system 100 includes an operation schedule processor 110, a first detection processor 121, a second detection processor 122, a third detection processor 123, a contact determination processor 130, a distance calculation processor 140, and an operation control processor 150.

The operation schedule processor 110 schedules the operation of the robot 1 specified as a desired path defined by representative points, such as gravity points, of the robot 1, desired landing positions of each leg 13, a desired foot landing cycle, and the like.

The first detection processor 121 detects the shape, size, and position of an object located ahead of the robot 1 based on images captured by the pair of CCD cameras 21. The object shape is detected (measured or predicted), for example, based on the variations in brightness along the outline of the object in the images captured by the CCD cameras 21. The object size is detected based on the area (number of pixels), height, position, and the like, of the object in the captured images. The object position or location is detected based on the height position of the object in the captured images, the parallax of the CCD cameras 21, and the like.

The second detection processor 122 detects the position or location of an object located around the robot 1 based on the ultrasonic waves detected by the plurality of ultrasonic sensors 22. The position or location of the object is detected (measured or predicted) based on the time period from the irradiation of the ultrasonic waves until the ultrasonic sensors 22 detect the ultrasonic waves.

The third detection processor 123 detects the shape, size, and position of an object located ahead of the robot 1 based on the infrared images captured by the pair of infrared cameras 23. Specifically, the three-dimensional shape, size, and position of the object are detected based on emission lines imaged with the slit-shaped laser beams irradiated in the detection range C, that is, according to a so-called optical cutting method.

The contact determination processor 130 determines the presence or absence of a predicted contact position based on the position or location of the object detected by the first detection processor 121, the second detection processor 122, and the third detection processor 123, respectively. The term "predicted contact position" means a position where the robot 1 has the possibility to come into contact with the object in its desired path.

When the contact determination processor 130 determines that there is a predicted contact position between the robot 1 and the object, the distance calculation processor 140 calculates the distance from the robot 1 to the predicted contact position along the desired path.

The operation control processor 150 controls the operation of the robot 1 as follows. When the distance calculated by the distance calculation processor 140 is less than a first threshold, the moving speed is reduced to a first speed. When the calculated distance is less than a second threshold lower than the first threshold, the moving speed is reduced from the first speed to a second speed. When the calculated distance is less than a third threshold lower than the second threshold, the moving speed is reduced from the second speed to zero (third speed).

The functions of the robot 1 having the above structure will next be described with reference to FIGS. 5 to 8.

Figure 5:
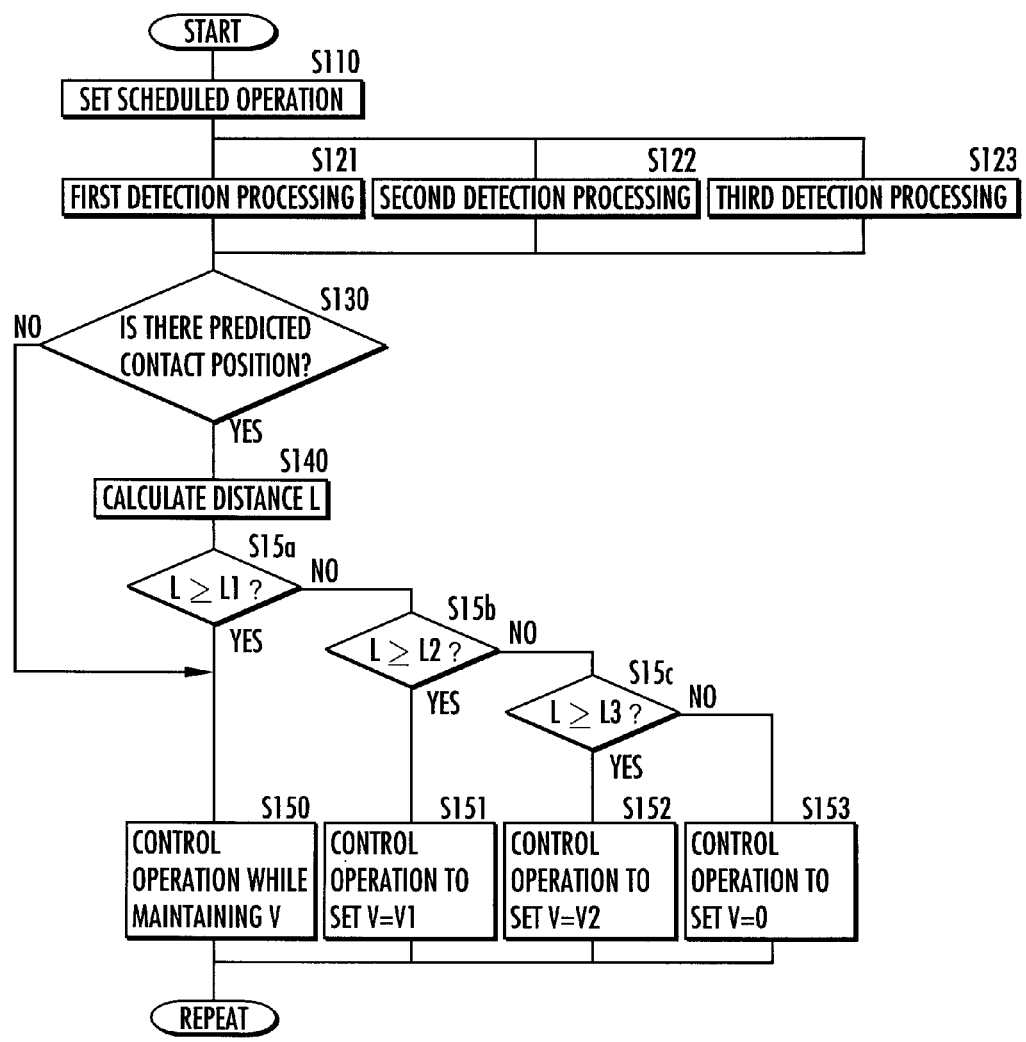
FIG. 5 is a flowchart showing the functions of a legged mobile robot according to the present invention.
Figure 6:
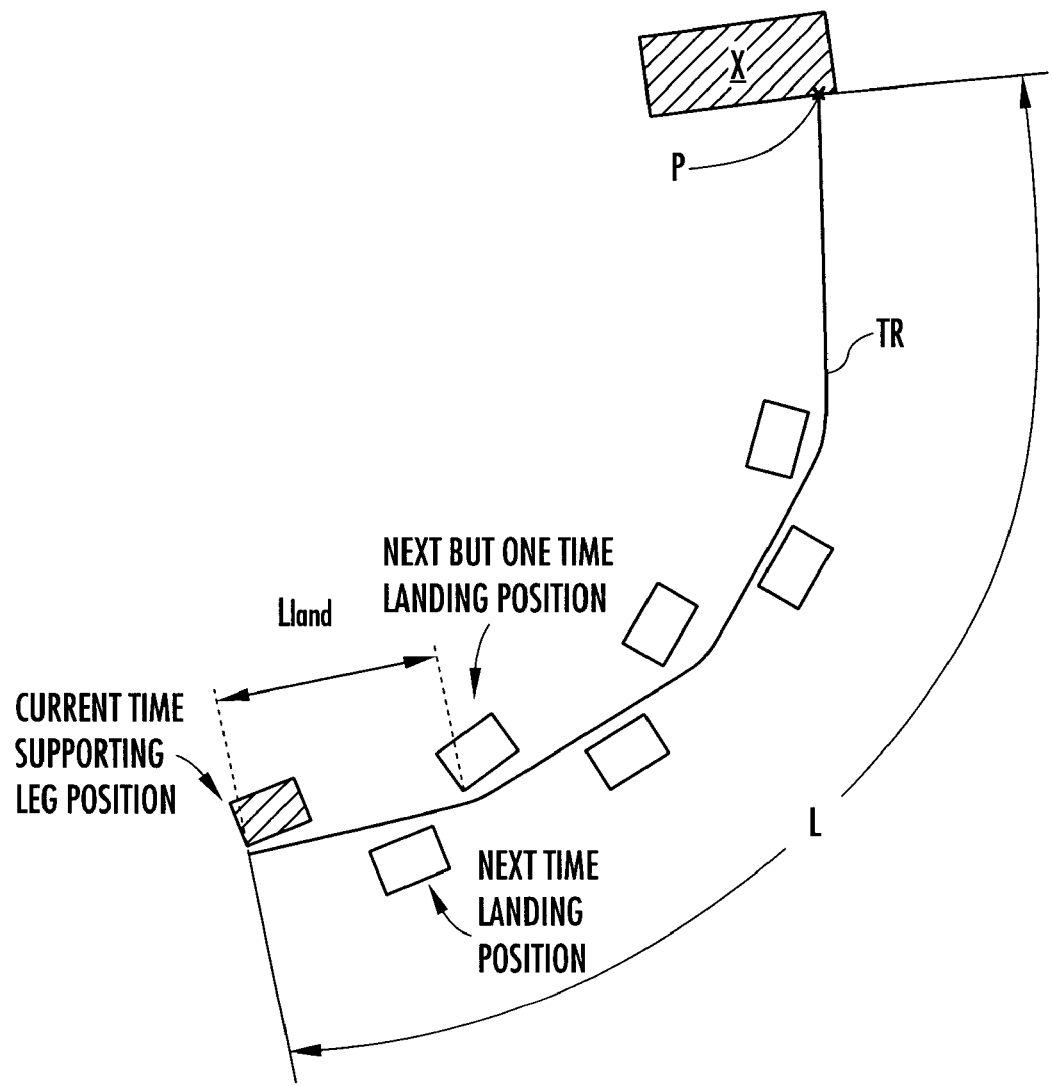
FIG. 6 is a diagram showing a moving pattern of the robot at a first position.

First, the operation schedule processor 110 sets the scheduled operation of the robot 1 (S110 in FIG. 5). With this operation, for example, as shown in FIG. 6, the desired path TR, the next time right-foot landing position, and the next-but-one time left-foot landing position, etc. are set. The desired path TR may be set only in the horizontal direction (back and forth, right and left), or in both the horizontal direction and the vertical direction (up and down).

Following this step, the first detection processor 121 performs "first detection processing" for detecting the positions and the like of objects around the robot 1 based on imaging information from the pair of CCD cameras 21 (S121 in FIG. 5). The second detection processor 122 performs "second detection processing" for detecting the positions and the like of objects around the robot 1 based on ultrasonic detection information from each of the ultrasonic sensors 22 (S122 in FIG. 5). The third detection processor 123 performs "third detection processing" for detecting the positions and the like of objects around the robot 1 based on infrared imaging information from the pair of infrared cameras 23 (S123 in FIG. 5).

For example, as shown in FIG. 6, when an object X is located diagonally forward left from the robot 1, the position and the like of the object X is detected by the first detection processing. However, since the object X is deviated from the ultrasonic detection range B of the ultrasonic sensor 22 and the infrared detection range C of the infrared cameras 23 shown in FIG. 2(a), the position and the like of the object X are not detected by the second and third processing.

Next, the contact determination processor 130 determines the presence or absence of a position (predicted contact position) at which it is predicted that the robot 1 will come into contact with an object, whose position and the like are detected by the first to third processing, in the desired path set by the operation schedule processor 110 (S130 in FIG. 5). For example, as shown in FIG. 6, when part of the object X is in the way of the desired path TR, it is determined that there is a predicted contact position P between the robot 1 and the object X.

If the contact determination processor 130 determines that there is no predicted contact position (there is no object around the robot 1 that has the possibility to come into contact with the robot 1) (NO in S130 in FIG. 5), the operation control processor 150 controls the operation of the legs 13 and the like while maintaining the moving speed V of the robot 1 (S150 in FIG. 5).

On the other hand, if the contact determination processor 130 determines that there is a predicted contact position (there is an object around the robot 1 that has the possibility to come into contact with the robot 1) (YES in S130 in FIG. 5), the distance calculation processor 140 calculates a distance L from the current position (of a representative point such as a gravity point) of the robot 1 from the predicted contact position (S140 in FIG. 5).

If the distance L is equal to or more than a first threshold $L_1$ (YES in S15a in FIG. 5), the operation control processor 150 controls the operation of the legs 13 and the like while maintaining the moving speed V of the robot 1 (S150 in FIG. 5).

Then, if the distance L is less than the first threshold $L_1$ but not less than a second threshold $L_2$ (NO in S15a and YES in S15b in FIG. 5), the operation control processor 150 controls the operation of the legs 13 and the like to reduce the moving speed V of the robot 1 to $V_1$ (S151 in FIG. 5). Further, if the distance L is less than the second threshold $L_2$ but not less than a third threshold $L_3$ (NO in S15b and YES in S15c in FIG. 5), the operation control processor 150 controls the operation of the legs 13 and the like to reduce the moving speed V of the robot 1 from $V_1$ to $V_2$ (S152 in FIG. 5). On the other hand, if the distance L is less than the third threshold $L_3$ (NO in S15c in FIG. 5), the operation control processor 150 controls the operation of the legs 13 and the like to reduce the moving speed V of the robot 1 from $V_2$ to 0 (S153 in FIG. 5). In decelerating the speed of the robot 1, the operation of the legs 13 and the like is so controlled that the next time and later landing positions are changed to shorter ones to make the lengths of stride shorter, or the next and later landing cycles are prolonged, or the next and later lengths of stride are made shorter and the next and later landing cycles are prolonged.

The first threshold $L_1$, the second threshold $L_2$, and the third threshold $L_3$ are set according to the following equations (1a) to (1c) and stored in the memory by the operation control processor 150 based on the distance $L_{land}$ from the current time supporting leg position to the next-but-one time supporting leg position as shown in FIG. 6 determined by the operation schedule:

$$L_1 = L_a + L_{land} \tag{1a}$$

$$L_2 = L_b + L_{land} \tag{1b}$$

$$L_3 = L_c + L_{land} \tag{1c}$$

Figure 7:
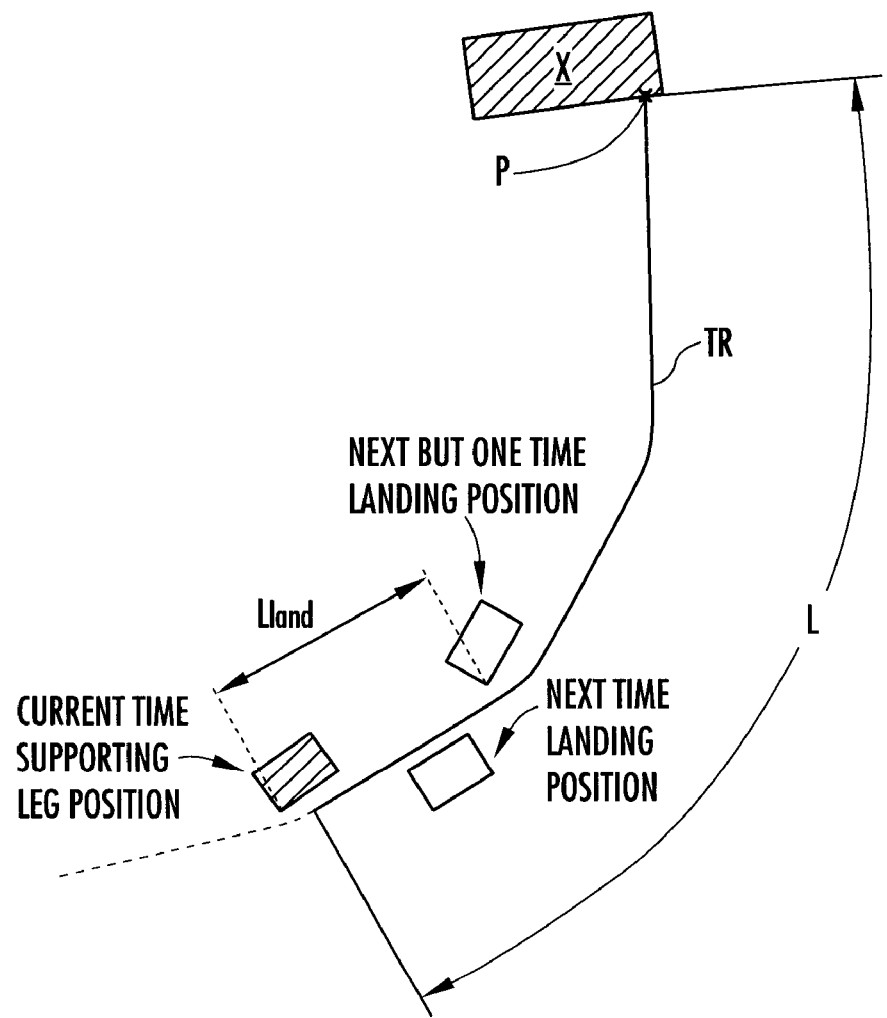
FIG. 7 is a diagram showing a moving pattern of the robot at a second position.
Figure 8:
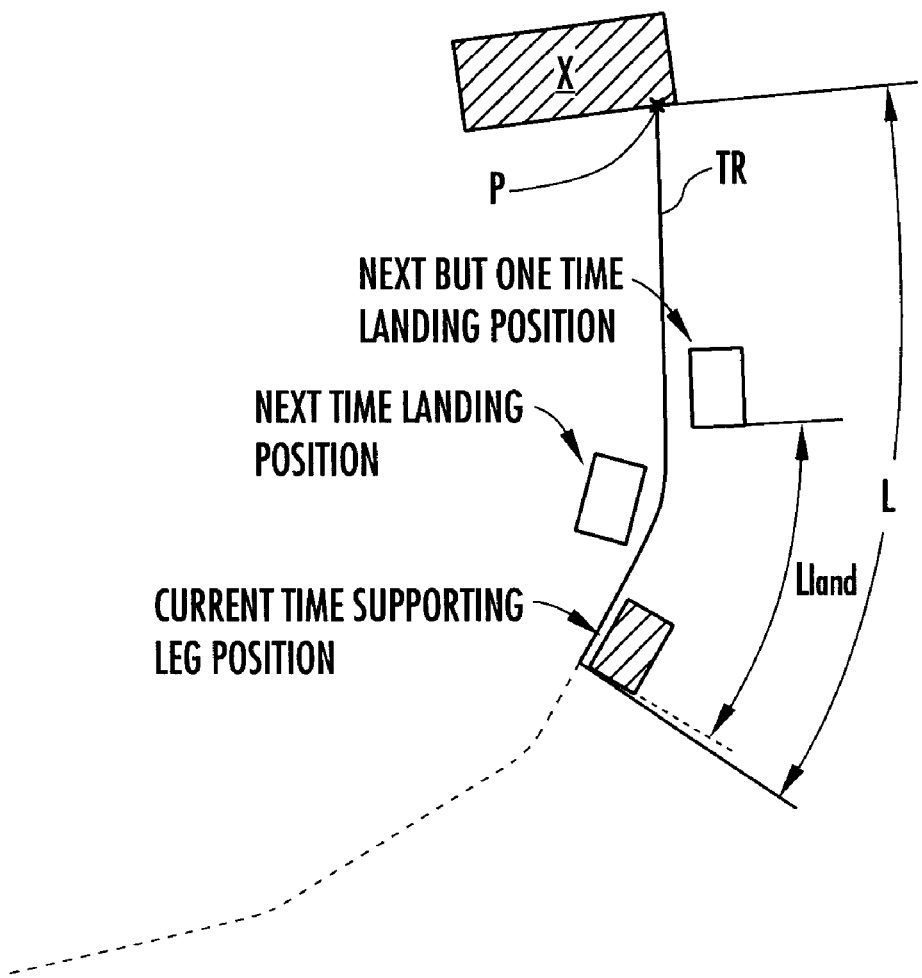
FIG. 8 is a diagram showing a moving pattern of the robot at a third position.

According to the robot 1 functioning as mentioned above, if there is the object X that can come into contact with the robot 1 in the desired path TR as shown in FIG. 6, the robot 1 is decelerated stepwise as the distance L to the predicted contact position P with the object X decreases. For example, as shown in FIG. 6 to FIG. 8, as the distance L gradually decreases, the operation of the robot 1 is controlled to reduce the moving speed V of the robot 1 stepwise to the first speed $V_1$, to the second speed $V_2$, and to 0 (corresponding to the third speed $V_3$).

Thus, in view of such a unique moving pattern that the landing positions of each leg 13 are not continuous but are discrete, the robot 1 can be decelerated while keeping the behavior of the robot 1 stable. This makes it possible to perform subsequent operation control smoothly, such as to stop the robot 1 or change the path, to avoid contact with the object X.

The operation control processor 150 may also control the landing positions of the legs 13 at some or all of the deceleration start and end times, during which the moving speed of the robot 1 is reduced to the first speed $V_1$, to the second speed $V_2$, or to 0, based on the position (or location) of the object measured by the first detection processor 121, the second detection processor 122, or the third detection processor 123.

According to the robot 1 having the above structure, a proper landing position of each leg 13 at the deceleration start or end time to the first speed $V_1$ or the like can be set by making appropriate use of such a unique moving pattern that the landing positions of each leg 13 are discrete from the standpoint of avoiding contact between the robot 1 and the object while keeping the behavior of the robot 1 stable. For example, if it is determined from the detected position of the object X that the possibility of the robot 1 coming into contact with the object X can be reduced by a twisting motion of the body 10 about a yawing axis where the left shoulder comes forward of the right, the landing position of each leg 13 at the deceleration start or end time can be so controlled that the right leg 13 will come forward of the left leg 13 from the standpoint of avoiding unstable behavior or posture of the robot 1 due to the twisting motion of the body 10.

Further, the operation control processor 150 may control the operation of the robot 1 in such a manner that the rate of change in either or both of the length of stride of the robot 1 and/or the landing cycle will fall within a tolerable range.

According to the robot 1 having the above structure, it is possible to avoid the situation where the rate of change in the length of stride or the landing cycle becomes such a low level that it falls below the lower limit of the tolerable range, so that the deceleration becomes insufficient from the standpoint of avoiding contact with the object. On the other hand, it is possible to avoid the situation where the rate of change in the length of stride or the landing cycle becomes such a high level that it exceeds the upper limit of the tolerable range, so that the behavior of the robot 1 becomes unstable despite deceleration is sufficient from the standpoint of avoiding contact with the object.

Furthermore, the operation control processor 150 may set some or all of the first threshold $L_1$, the second threshold $L_2$, the third threshold $L_3$, the first speed $V_1$, and the second speed $V_2$ based on either or both of the scheduled length of stride and/or the scheduled landing cycle.

According to the robot 1 having the above structure, unstable behavior due to unreasonable deceleration can be avoided in view of the scheduled length of stride or the scheduled landing cycle. For example, if the first speed $V_1$ or the like is set according to the scheduled length of stride, it is possible to avoid the need to shorten the length of stride excessively upon deceleration to the first speed $V_1$, thereby avoiding unstable behavior of the robot 1. On the other hand, if the first speed $V_1$ or the second speed $V_2$ is set according to the scheduled landing cycle, it is possible to avoid the need to prolong the landing cycle excessively upon deceleration to the first speed $V_1$ or the second speed $V_2$, thereby avoiding unstable behavior of the robot 1.

Furthermore, when the contact determination processor 130 determines that there is a predicted contact position between the robot 1 and the object, the operation control processor 150 may set some or all of the first threshold $L_1$, the second threshold $L_2$, the third threshold $L_3$, the first speed $V_1$, and the second speed $V_2$ according to the type or the combination of types of detection processors selected among the first detection processor 121, the second detection processor 122 and the third detection processor 123 as having detected the position or location of the object.

According to the robot 1 having the above structure, the first threshold $L_1$ and the like are set properly in view of the detection characteristics of the plural kinds of detection processors 121 to 123, and eventually those of the CCD camera 21, the ultrasonic sensor 22, and the infrared camera 23.

The control system 100 may further include a malfunction determination processor for determining the presence or absence of a detection malfunction of any of the infrared cameras 23 and the like. In this case, when the malfunction determination processor determines that there is a detection malfunction of any of the infrared cameras 23 and the like, the operation control processor 150 may set some or all of i-th thresholds $L_i$ (where i=1, 2, 3) larger than in the case when the malfunction determination processor determines that the detection function is normal. Alternatively, it may set either or both of the first speed $V_1$ and the second speed $V_2$ lower, or some or all of the i-th thresholds $L_i$ larger and either or both of the first speed $V_1$ and the second speed $V_2$ lower.

According to the robot 1 having the above structure, when a malfunction occurs in detecting the position and the like of the object, the first threshold $L_1$ or the second threshold $L_2$ is set higher to accelerate the start of deceleration, or the first speed $V_1$ or the second speed $V_2$ is set lower to make the robot 1 move more slowly, so that a sufficient distance between the robot 1 and the object can be kept from the standpoint of avoiding contact between both. Therefore, the robot 1 can operate to avoid contact with the object even if the malfunction occurs and the function of detecting the position or the like of the object is declined.

Furthermore, the operation control processor 150 may set some or all of the first threshold $L_1$, the second threshold $L_2$, the third threshold $L_3$, the first speed $V_1$, and the second speed $V_2$ according to the number of objects, whose positions are detected by some or all of the first detection processor 121, the second detection processor 122, and the third detection processor 123, or which are determined by the contact determination processor 130 to be located at predicted contact positions with the robot 1.

According to the robot 1 having the above structure, some or all of the first threshold $L_1$, the second threshold $L_2$, the third threshold $L_3$, the first speed $V_1$, and the second speed $V_2$ are set properly according to the robot environment represented as the magnitude of the number of objects located around the robot 1. Therefore, the robot 1 can operate to avoid contact with the object in view of the environment.

Furthermore, some or all of the first detection processor 121, the second detection processor 122, and the third detection processor 123 may detect an object speed (which can be determined by the time derivative of the position of the object), and the operation control processor 150 may set some or all of the first threshold $L_1$, the second threshold $L_2$, the third threshold $L_3$, the first speed $V_1$, and the second speed $V_2$ based on the detected speed of the object.

According to the robot 1 having the above structure, some or all of the first threshold $L_1$, the second threshold $L_2$, the third threshold $L_3$, the first speed $V_1$, and the second speed $V_2$ are set properly according to the object speed. Therefore, the robot 1 can operate to avoid contact with the object in view of the object speed. For example, when the object is in motion but its motion cannot be predicted, the first threshold $L_1$ or the like can be set higher to accelerate the start of deceleration, or the first speed $V_1$ is set lower to make the robot 1 move more slowly, so that the robot 1 can operate to avoid contact with the object while keeping a sufficient distance to the object from the standpoint of avoiding contact with the object.

What is claimed is:

1. A legged mobile robot, which moves with repeated lifting off and landing on a floor of each of a plurality of legs extending from a body, the legged mobile robot comprising:
   one or more detection processors for detecting a position or location of objects around the robot;
   a contact determination processor for determining a presence or absence of a predicted contact position, at which the robot has a possibility to come into contact with an object in its desired path, based on the position or location of the object measured by the one or more detection processors;
   a distance calculation processor for calculating a distance from the robot to the predicted contact position when the contact determination processor determines the presence of the predicted contact position between the robot and the object;
   an operation control processor for controlling operation of the robot such that when the distance calculated by the distance calculation processor is less than a first threshold, a moving speed is reduced to a first speed by controlling at least one of a length of stride and a landing cycle, and when the calculated distance is less than an (i+1)-th threshold lower than an i-th threshold (where i=1, 2, . . . ), the moving speed is reduced from an i-th speed to an (i+1)-th speed; and
   a malfunction determination processor for determining a presence or absence of a detection malfunction of any detection functions of the one or more detection processors,
   wherein the operation control processor of the robot controls the operation of the robot such that a rate of change in the at least one of the length of stride and the landing cycle of the robot falls within a tolerable range that is set to allow sufficient deceleration while maintaining stability of the robot, and
   wherein when the malfunction determination processor determines that there is a detection malfunction of any of the detection functions of the one or more detection processors, the operation control processor sets the i-th speed lower than in a case when the malfunction determination processor determines that the detection function of the corresponding detection processor is normal.

2. The legged mobile robot according to claim 1, wherein the operation control processor controls landing positions of the legs at some or all of the deceleration start and end times, during which the moving speed of the robot is reduced to the i-th speed, based on the position or location of the object measured by the one or more detection processors.

3. The legged mobile robot according to claim 1, wherein the operation control processor sets some or all of the i-th thresholds and the i-th speeds according to the number of objects, whose positions are detected by the detection processor, or which are determined by the contact determination processor to be located at the predicted contact position with the robot.

4. The legged mobile robot according to claim 1, wherein the operation control processor sets some or all of the i-th thresholds and the i-th speeds based on either or both of a scheduled length of stride and a scheduled landing cycle.

5. The legged mobile robot according to claim 1, further comprising
   plural kinds of detection processors as the one or more detection processors,
   wherein when the contact determination processor determines that there is a predicted contact position between the robot and the object, the operation control processor sets some or all of the i-th thresholds and the i-th speeds according to a type or a combination of types of detection processors having detected the position or location of the object, among the plural kinds of detection processors.

6. The legged mobile robot according to claim 1, wherein the one or more detection processors detects a speed of the object, and
   the operation control processor sets some or all of the i-th thresholds and the i-th speeds based on the detected speed of the object.

7. A program recorded on a computer readable medium for causing a computer mounted in a legged mobile robot, which moves with repeated lifting off and landing on a floor of each of a plurality of legs extending from a body, to function as a system for controlling the robot, the system comprising:
   one or more detection processors for detecting a position or location of objects around the robot;
   a contact determination processor for determining a presence or absence of a predicted contact position, at which the robot has a possibility to come into contact with an object in its desired path, based on the position or location of the object measured by the one or more detection processors;
   a distance calculation processor for calculating a distance from the robot to the predicted contact position when the contact determination processor determines the existence of the predicted contact position between the robot and the object;
   an operation control processor for controlling the operation of the robot such that when the distance calculated by the distance calculation processor is less than a first threshold, a moving speed is reduced to a first speed by controlling at least one of a length of stride and a landing cycle, and when the calculated distance is less than an (i+1)-th threshold lower than an i-th threshold (where i=1, 2, . . . ), the moving speed is reduced from an i-th speed to an (i+1)-th speed; and
   a malfunction determination processor for determining a presence or absence of a detection malfunction of any detection functions of the one or more detection processors,
   wherein the operation control processor of the robot controls the operation of the robot such that a rate of change in the at least one of the length of stride and the landing cycle of the robot falls within a tolerable range that is set to allow sufficient deceleration while maintaining stability of the robot, and
   wherein when the malfunction determination processor determines that there is a detection malfunction of any of the detection functions of the one or more detection processors, the operation control processor sets the i-th speed lower than in a case when the malfunction determination processor determines that the detection function of the corresponding detection processor is normal.

8. A supervising system for supervising the functions of a legged mobile robot, which moves with repeated lifting off and landing on a floor of each of plural legs extending from a body, wherein the program according to claim 7 is distributed or broadcast to the computer.

9. A method of controlling the operation of a legged mobile robot, which moves with repeated lifting off and landing on a floor of each of a plurality of legs extending from a body, the method comprising the steps of:

a detection processing step of detecting a position or location of objects around the robot;

a contact determination processing step of determining a presence or absence of a predicted contact position, at which the robot has a possibility to come into contact with an object in its desired path, based on the position or location of the object measured in the detection processing step;

a distance calculation processing step of calculating a distance from the robot to the predicted contact position when it is determined in the contact determination processing step that there is the predicted contact position between the robot and the object;

an operation control processing step of controlling the operation of the robot such that when the distance calculated in the distance calculation processing step is less than a first threshold, a moving speed is reduced to a first speed by controlling at least one of a length of stride and a landing cycle, and when the calculated distance is less than an (i+1)-th threshold lower than an i-th threshold (where i=1, 2, ... ), the moving speed is reduced from an i-th speed to an (i+1)-th speed; and a malfunction determination processing step of determining a presence or absence of a detection malfunction of any detection functions of the one or more detection processors, wherein the operation of the robot is controlled such that a rate of change in the at least one of the length of stride and the landing cycle of the robot falls within a tolerable range that is set to allow sufficient deceleration while maintaining stability of the robot, and wherein when the malfunction determination processing step determines that there is a detection malfunction of any of the detection functions of the one or more detection processors, the operation control processing step sets the i-th speed lower than in a case when the malfunction determination processing step determines that the detection function of the corresponding detection processor is normal.

* * * * *